Feb. 18, 1947.  C. L. CHRISTIAN  2,415,991
PORTABLE SIGNALING DEVICE
Filed Feb. 4, 1944    2 Sheets-Sheet 1

INVENTOR.
C. L. CHRISTIAN
Edward Healy
ATTORNEY.

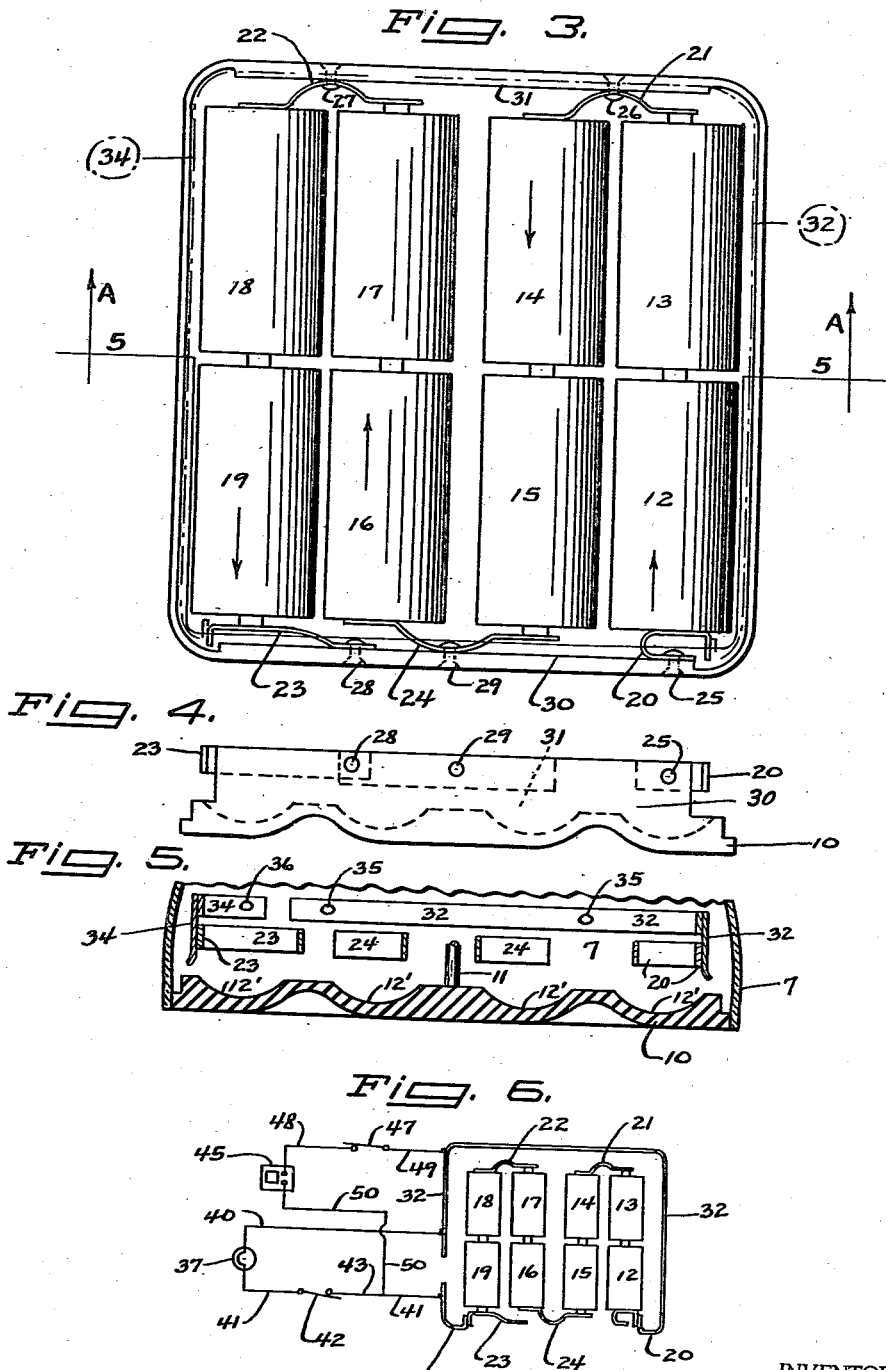

Patented Feb. 18, 1947

2,415,991

UNITED STATES PATENT OFFICE 2,415,991

PORTABLE SIGNALING DEVICE

Charles L. Christian, Burlingame, Calif.

Application February 4, 1944, Serial No. 521,045

3 Claims. (Cl. 177—329)

This invention relates to improvements in ash trays that are adapted for use in restaurants, cocktail lounges and the like places.

An object of the invention is to provide an improved combined ornamental ash tray and waiter signalling device which has embodied in its construction an illuminated signal and a buzzer signal, both of which are operated from a plurality of storage batteries positioned beneath the ash tray.

Another object of the invention is to improve the shape of the device to enable a large number of storage batteries to be used in proportion to its size and to thus supply a maximum amount of electrical energy for operating the illuminated signal and the buzzer.

Another object of the invention is to provide a removable cover in the bottom of the device and to further provide means on said cover for holding the storage batteries and electrically connecting them together.

A still further object of the invention is to improve the signaling device by providing an especially designed miniature lamp shade around the illuminating means, and which will enhance the attractiveness of the device.

Other objects and advantages will be apparent during the course of the following description.

In the accompanying drawings forming a part of this specification and in which like numerals are employed to designate like parts throughout the same:

Fig. 3 is a plan view of the inside of the bottom cover and also shows the preferred arrangement of the storage batteries therein and the means provided for electrically connecting the storage batteries together;

Fig. 4 is a side elevation of the bottom cover;

Fig. 5 is a vertical sectional view of the bottom cover taken on line 5—5 of Fig. 3, looking in the direction of the arrows A—A, and is also a similar sectional fragmentary view of the main housing of the device, and shows the cover in position of said housing, illustrating how the electrical contacts for forming the electrical circuit with the storage batteries are closed when the cover is in position, and Fig. 6 is a diagrammatic plan view of the relative arrangement of electrical elements which form the electrical circuits embodied in the invention.

Figure 1:
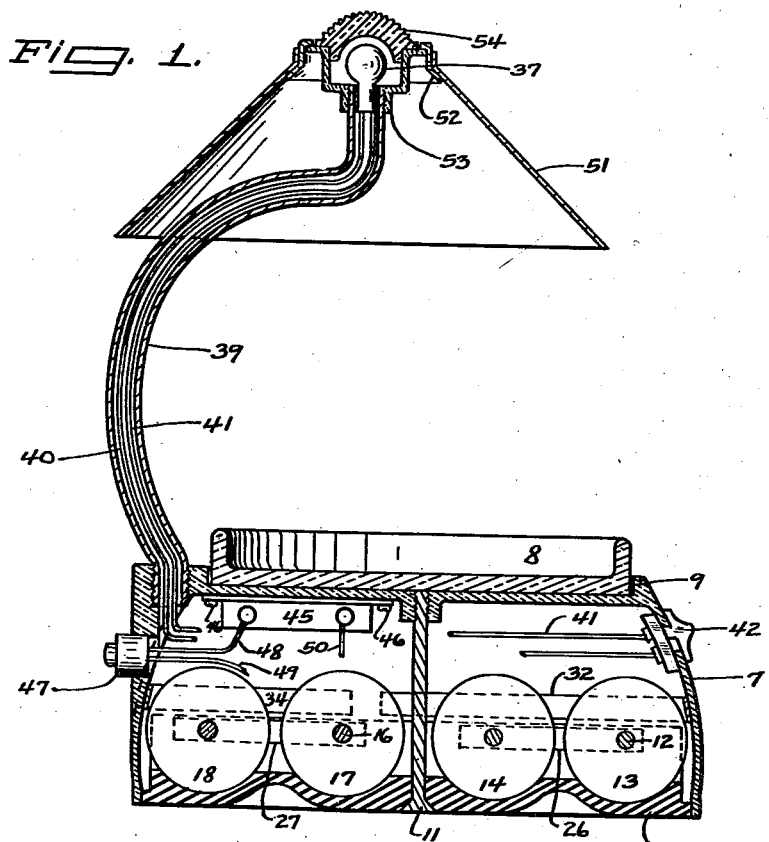
Fig. 1 is a central vertical longitudinal sectional view of the improved device involving the invention.
Figure 2:
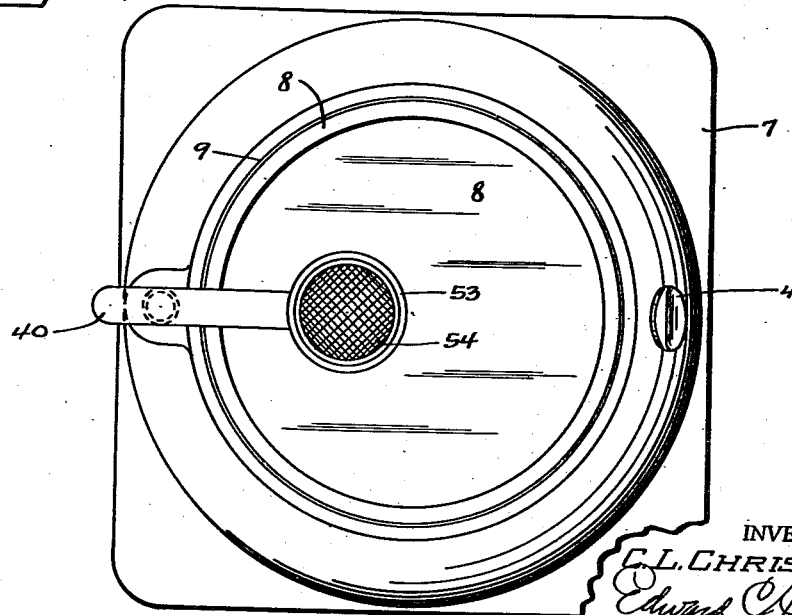
Fig. 2 is a top plan fragmentary view of the same.

Referring in detail to the different parts the numeral 7 designates a suitable housing that can be made of plastic or any other suitable material and is preferably formed rectangular at the lower portion thereof to accommodate the storage batteries and changes to a circular form at the top portion to accommodate a circular ash tray 8 that is removably mounted in the depressed portion 9 of said housing. The cover 10 encloses the bottom of the housing and is threadedly secured to the top thereof by an elongated bolt 11 as shown in Fig. 1. A plurality of circular depressions 12' are formed across the inside surface of said cover and are provided to carry a plurality of storage batteries 12, 13, 14, 15, 16, 17, 18 and 19 that are arranged in series and in parallel with each other as shown in Fig. 3. Said storage batteries are removably held onto the cover by a plurality of resilient metal members 20, 21, 22, 23 and 24 that are substantially held to the cover by suitable rivets 25, 26, 27, 28 and 29 respectively, said cover having two reinforced opposing sides 30 and 31, as shown in Fig. 3, that extend upwardly as shown in Fig. 4, to accommodate said metal members. Conducting strips 32 and 34 are fastened thereto by suitable rivets 35 and 36 respectively and are adapted to form contact with the metal members 20 and 23 respectively, when the cover is in position as shown in Fig. 5. It will be noted that said metal members 32 and 34 in the housing form a broken band around three sides of the housing as illustrated in dot and dash outline in Fig. 3 and extend above the metal contact members in the cover with the exception of portions that project downwardly to contact the metal members 20 and 23.

A miniature electric lamp 37 is mounted into a suitable socket 38 that is provided into the top end portion of a substantial elongated curved tube 39, the lower end portion of which is threadedly secured into the top portion of the housing 7 as shown in Fig. 1. Suitable insulated electric conductors 40 and 41 extend from said lamp 37 and through said tube 39, the electric conductor 40 being connected to the metal member 32 and conductor 41 being connected to a conventional electric switch 42 that has contact with the metal member 34 through the conductor 43 as shown in Fig. 6.

A miniature buzzer 45 is positioned within the upper portion of the housing and is fastened to the top thereof by suitable screws 46 and is provided with an electric switch 47 and is electrically connected to the storage batteries by suitable electric conductors 48 and 49 that are connected to the metal member 32 and electric conductors 50 and 41 that are connected to the metal member 34.

The device is thus provided with two signals, namely, an illuminating signal and a buzzer, both of which serve an important purpose. When a patron in a restaurant, or the like, desires to request the service of a waiter, he can do so by operating both signals. The waiter's attention will be attracted by the buzzer and upon looking over his tables will note at a glance the party requesting service by observing the particular table upon which the signal lamp is illuminated.

The illuminated signal is made more attractive by being adorned with an ornamental shade 51 that is preferably semi-transparent to softly diffuse the light that is supported on a tapered circular member 52 that rests on a bracket 53 that can be made of a plastic material and also may be semi-transparent. The jewel 54 is mounted into said bracket 53 and will cause light rays of a delicate color to be projected upward. The electric switch 42 for illuminating the lamp is preferably a conventional electric slide switch and the buzzer switch 47 is preferably of the conventional push button type to enable it to be operated intermittently.

The electric switch 42 however, can be of the push button type and operated intermittently or an auxiliary flasher switch may be provided in addition to the regular electric switch to enable the electric lamp to be steadily illuminated, or to be flashed on and off whenever desired.

It is to be understood that the forms of my invention herewith shown and described are to be taken as preferred examples of the same and that various changes relative to the material, size, shape and arrangement of parts may be resorted to without departing from the spirit of the invention or the scope of the subjoined claims.

Having thus described my invention, I claim:

1. A portable signalling device embodying in its construction a box-like housing having an upper surface adapted to support an ash tray or the like thereon, said housing having an open bottom; conducting strips on the inner walls of said housing; a cover for the open bottom of said housing having upwardly projecting portions at two opposite ends thereof; a plurality of spaced contacts on the upwardly-projecting end portions of said cover; means for electrically connecting said conducting strips and said contacts when said housing and cover are assembled; signalling means associated with said housing and electrically connected to said conducting strips; a storage battery supported on said cover with its terminals engaging the contacts on said cover; and a switch electrically connected to said conducting strips for controlling the circuit from said battery to said signalling means.

2. A portable signalling device embodying in its construction a box-like housing having an upper surface adapted to support an ash tray or the like thereon; said housing having an open bottom; conducting strips on the inner walls of said housing; a cover for the open bottom of said housing having upwardly projecting portions at two opposite ends thereof; a plurality of spaced contacts on the upwardly-projecting end portions of said cover; spaced contact members depending from said conducting strips and movable into contact with said spaced contacts when said housing and cover are assembled whereby said conducting strips and spaced contacts are electrically connected; signalling means associated with said housing and electrically connected to said conducting strips; a storage battery supported on said cover with its terminals engaging the contacts on said cover; and a switch electrically connected to said conducting strips for controlling the circuit from said battery to said signalling means.

3. A portable signalling device as defined in claim 1, wherein the signalling means is an audible signalling means mounted within the housing.

CHARLES L. CHRISTIAN.

REFERENCES CITED

The following references are of record in the file of this patent:

UNITED STATES PATENTS

| Number | Country | Date |
| --- | --- | --- |
| 723,845 | Dodd | Mar. 31, 1903 |
| 1,149,933 | Martzolf | Aug. 10, 1915 |
| 2,339,471 | Foresman et al. | Jan. 18, 1944 |
| 1,622,196 | Howell | Mar. 22, 1927 |
| 1,883,546 | Campos et al. | Oct. 18, 1932 |
| 2,114,460 | Ziegler | Apr. 19, 1938 |